ELECTRICAL CAPACITOR

Filed Oct. 15, 1964

INVENTORS.
ALBERT E. SCHERR III
BY HENRY F. PUPPOLO
Connolly and Hutz
THEIR ATTORNEYS 3,231,800

ELECTRICAL CAPACITOR

Albert E. Scherr III, Williamstown, and Henry F. Puppolo, North Adams, Mass., assignors to Sprague Electric Company, North Adams, Mass., a corporation of Massachusetts Filed Oct. 15, 1964, Ser. No. 404,042
3 Claims. (Cl. 317—258)

This is a continuation-in-part of application Serial No. 253,678, filed January 24, 1963, now abandoned.

It is known that a dry tantalum capacitor can be produced by anodizing the tantalum and depositing on the anodic oxide, by surface catalyzed chemical reduction, a metal counter-electrode. More specifically, in one method the surface of the tantalum body, is oxidized by means of an aqueous phosphoric acid solution at an elevated temperature, with an applied voltage being gradually raised to a maximum while maintaining a high current density. Thereafter, the dielectric oxide film is metal plated by surface catalyzed chemical reduction (also known as electroless plating). A preferred metal for plating is nickel. One suitable bath solution for electroless nickel plating is Brenner's "acid bath B" (U.S. Bu. of Stds. Circular, March 1, 1958). Plating may be carried out by immersing the wire helix in the electroless nickel bath.

It is also well-known that a capacitor of the kind described is self-healing if the outer electrode is very thin. In order to effectively employ the capacitor it is necessary to make a suitable contact with the plated nickel. For obvious reasons solder is by far the preferred contact material. This material, however, poses two serious problems. First, solder tends to dissolve the extremely thin (e.g. 1500 A.) outer electrode yielding a disrupted or imperfect cathodic contact. Second, experience has shown that any type of massive contact will lead to complete failure in the event a short develops beneath the contact. Under applied voltage sparking occurs at points of dielectric weakness between the contact and the anode. When a massive solder contact is employed, the sparking cannot be interrupted because the very massiveness of the metal at the point of contact prevents volatilization of the metal at the point of sparking. The contact dissipates the heat generated at the short and the area will not clear. The result is a permanent short.

The formation of a capacitor of the foregoing type, which is not prone to permanent shorting, presents somewhat of a dilemma. On the one hand, the basic capacitance formula shows that the shorter the distance between the electrodes the greater the capacitance; while on the other hand, the shorter the distance between electrodes the greater is the problem of dielectric weakness.

It is an object of the present invention to overcome the foregoing and related problems.

It is another object to present a capacitor not subject to permanent shorting.

It is yet another object to present a valve metal anode capacitor not subject to shorting in the region between the cathode contact and the anode.

A further object is to avoid counterelectrode dissolution in the solder contact.

Other objects will be apparent from the following specification when read in conjunction with the accompanying drawing in which.

With the above objects in view the present invention relates to an electrical capacitor comprising an anodized valve metal having a counterelectrode of self-healing thickness. The cathodic terminal region of said valve metal being in the form of a rod-like member of the same valve metal, extending from the main body thereof. For example, this member can be in the form of a wire or similar appendage which is an extension of the anode or made an integral part thereof, such as by welding. At least a part of the surface of the rod-like member has been formed to a voltage greater than that of said main body. A comparatively thick, solderable metal cathode contact is applied to the comparatively thin counterelectrode by a means calculated not to dissolve said counterelectrode. A cathode lead is soldered to this thick cathode contact. The unformed terminal region is contacted with a solderable lead.

If the capacitor of the present invention is rated, for example, at 50% of the formation voltage of the thin dielectric layer, it is extremely unlikely that there will be any dielectric breakdown in the region of the cathodic contact because this is the region having the greatest dielectric thickness. In other words, theoretically there should be no shorting at the cathodic contact because the dielectric in this region has been formed at a voltage of from about 1.1 to 4 times that employed for formation of the remainder of the dielectric. Moreover, an excellent electrical connection is insured by depositing a comparatively thick solderable contact on the counterelectrode in the cathode contact area.

A preferred embodiment of the invention comprises an anodized, valve metal, wire electrode. The wire is in the form of a helix having straight ends. One of the ends has been anodized to a greater voltage than the helical portion of the section. A metal counterelectrode is applied to the unit and a comparatively thick, solderable metal cathode contact is applied to said counterelectrode in the region of the thicker anodic oxide. A cathode lead is soldered to this thick cathode contact. The unformed anodic terminal region is contacted with a solderable lead wire.

The term valve metal is employed in its usual sense as including tantalum, niobium, titanium, etc. Aluminum, which is included within the term, does not possess all the advantages of the other metals. It appears to be extremely sensitive to impurities and subject to corrosion. It is, therefore, the least preferred of the anode metals.

Figure 1:
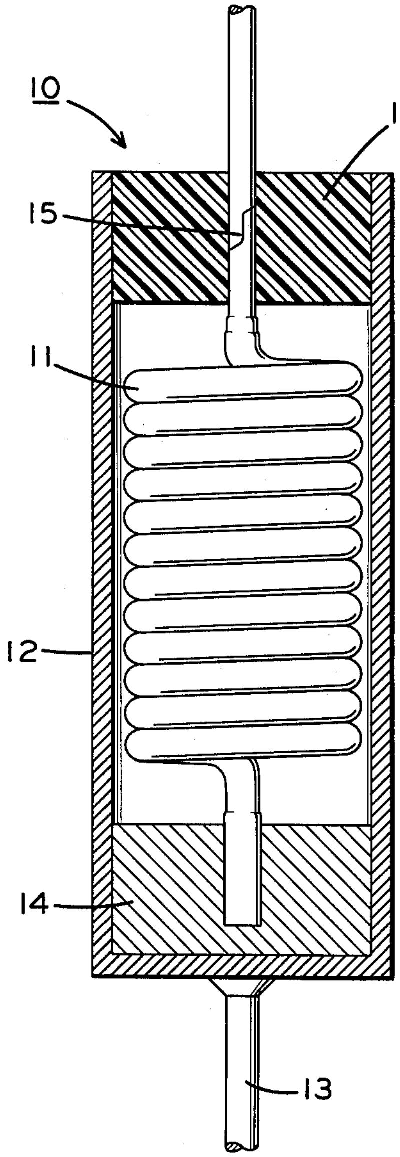
FIGURE 1 is a side view, in section, of a helical wire capacitor.
Figure 2:
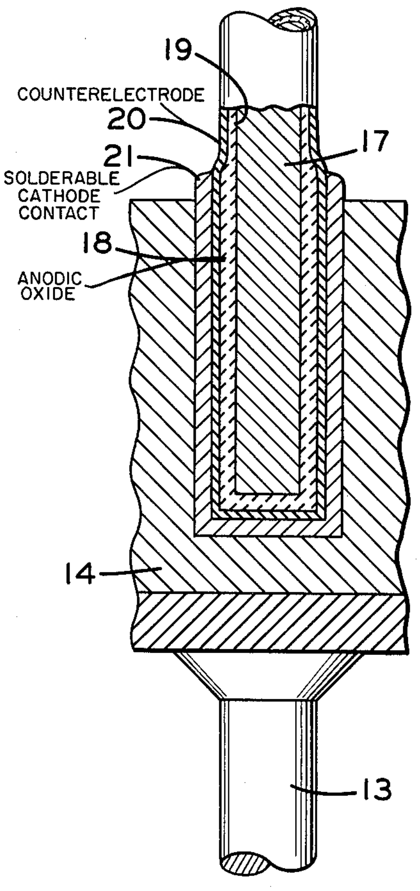
FIGURE 2 is a side view, in section, of the portion of the wire through which cathodic contact is made.

Referring to the drawing, 10 is a valve metal wire capacitor comprising, an anodized, helical valve metal wire 11 having a counterelectrode applied thereto; this capacitor section is positioned within capacitor can 12 which has a lead-wire 13 affixed thereto; the ends of the capacitor section are straight; a solderable wire is butt-welded at 15 to the valve metal wire and a suitable end seal 16 is positioned about the butt-weld, closing the opening in the can. FIGURE 2 illustrates, via a fragmentary cross-section, the cathode termination of the unit. The end 17 of the helix has been formed under suitable conditions of temperature and voltage so as to coat it with a comparatively thick layer of valve metal oxide 18. This is distinguished from the comparatively thin layer 19 of valve metal oxide which had been formed on the remainder of the helical valve metal wire. A self-clearing layer of a counterelectrode 20 is plated, in capacitive relationship with the valve metal, over all of the oxide, i.e. both the relatively thick layer and the relatively thin layer. A metal cathode contact 21 is deposited over the counterelectrode 20 only in the region of the comparatively thick oxide layer. Contact 21 is many times thicker than counterelectrode 20 and it is deposited by any convenient process which will not dissolve or disrupt said counterelectrode. Electroplating is a preferred method of deposition. This termination is firmly bonded to the bottom of the capacitor can by solder 14.

The capacitor illustrated in the drawing may be formed in the following manner using tantalum as representative of the valve metals and nickel as the counterelectrode: a helix of tantalum wire is formed electrochemically to produce a dielectric film thereon; thereafter the end of the helix which is to be contacted to a cathode lead via solder, is formed again to produce at the end an oxide layer approximately 1.1 to 4 times the thickness of the first dielectric layer. Following this, the helix is subjected to nickel plating by surface catalyzed chemical reduction (electroless nickel plating). The thicker oxide end of the nickel plated helix is then electroplated with copper to produce a layer ranging from about 5 to 20 times the thickness of the counterelectrode, e.g. a 0.05 mil layer over a 1500 A. counterelectrode. The plated helix is then soldered to the bottom of a capacitor can. Care should be exercised so that the solder contacts only the electroplated copper and not the electroless nickel. Thereafter, a solderable lead wire is butt-welded to the other end of the tantalum helix. Finally, an end-seal of some suitable moisture-impervious material is positioned about the butt-welded portion of the wire, closing the end of the container.

A modified construction of the subject capacitors is in the use of a plastic sleeve, such as polyethylene or polyethyleneterephthalate sleeve to house the capacitor section. In this construction, the capacitor section is inserted into the sleeve and electrical communication is made by use of a metal end cap with lead attached. The cap is soldered to the cathode contact.

The capacitor container, i.e. sleeve or can 12 can be of any material that does not interfere with the operation of the capacitor. Inert metals such as the noble metals, i.e. silver, gold and the platinum metals, are preferred, although stainless steel can be used. The wall thickness of the can or sleeve can be made extremely small, as little as 6 mils, inasmuch as the resin seal 16 provides the desired resistance against crushing. The seal 16 can be of any moisture-impervious material, for example a resin, preferably one that adheres well to the metal of the can or the polymeric sleeve. An unfilled epoxy-type resis is exceptionally effective although ordinary phenolic resins or any thermoplastic resin that will not soften at the maximum operating temperature of the capacitor can also be used. Cross-linked polystyrenes or styrene copolymers, or cross-linked polyesters of unsaturated acids are also suitable. Although not essential it is preferred that the resin can be cured without the application of molding pressures.

The counterelectrode metal is not limited to nickel, the noble metals, i.e. silver, gold and the platinum group metals can also be employed. For the purposes of this invention, graphite may also be employed as a counterelectrode. The metal need not be applied by the process known as surface catalyzed chemical reduction. Any known process which will apply a self clearing or self-healing layer of the counterelectrode over the oxide can be employed. By "a self clearing layer" or self-healing layer is meant a layer of about 1000 to about 3500 A.

The cathode contact metal which is deposited on the counterelectrode in the region of the thicker oxide layer can be any solderable metal so long as it does not dissolve or disrupt the counterelectrode. It may be the same as or different from the counterelectrode metal.

As many apparently widely different embodiments of this invention may be made without departing from the spirit and scope hereof, it is to be understood that the invention is not limited to the specific embodiments hereof except as defined in the appended claims.

What is claimed is:

1. An electrical capacitor comprising a capacitor section composed of a helical tantalum electrode having straight wire ends, an anodic oxide layer formed over all but one end of said electrode, the oxide layer on the formed end of said electrode being at least about 1.1 times thicker than that on the helical portion of the electrode, a nickel counterelectrode, of self-healing thickness, overlying said oxide in capacitive relationship with said wire electrode, a metal cathode contact deposited on the counterelectrode in the region of the thicker anodic oxide, said contact being at least about five times thicker than said counterelectrode, said capacitor section being positioned within a container open at at least one end; a solder connection between said metal cathode contact and a cathode lead; and said open end of said container being sealed with a moisture-impervious material.

2. An electrical capacitor comprising a capacitor section composed of a helical tantalum wire electrode having straight wire ends, an anodic oxide layer formed over all but one end of said electrode, the oxide layer on the formed end of said electrode being at least 1.1 times thicker than that on the helical portion of the electrode, a solderable lead wire joined to the unformed end of said section, a nickel counterelectrode, of a self-healing thickness, overlying said oxide in capacitive relationship with said wire electrode; a solderable metal cathode contact deposited on said counterelectrode in the region of the thicker anodic oxide, said contact being at least five times thicker than said counterelectrode; said capacitor being positioned within a sleeve, said cathode contact and a cathode lead being connected via solder; and a moisture-impervious material positioned about said lead wires closing the ends of the sleeve.

3. An electrical capacitor comprising a capacitor section composed of a helical tantalum wire electrode having straight wire ends, an anodic oxide layer formed over all but one end of said electrode, the oxide layer on the formed end of said electrode being at least about 1.1 times thicker than that on the helical portion of the electrode, a solderable lead wire joined to the unformed end of said section, a nickel counterelectrode, of self-healing thickness, overlying said oxide in capacitive relationship with said wire electrode, a metal cathode contact deposited on the counterelectrode in the region of the thicker anodic oxide, said contact being at least about five times thicker than said counterelectrode; said capacitor section being positioned within a metal can, a solder connection electrically communicating said cathode contact with the bottom of said can; and a moisture-impervious material positioned about said lead wire closing the end of the can.

References Cited by the Examiner

UNITED STATES PATENTS

| | | | |
|---|---|---|---|
| 2,244,090 | 6/1941 | Traub | 317—260 |
| 2,930,951 | 3/1960 | Burger | 317—258 X |
| 2,941,024 | 6/1960 | Lamphier | 317—242 X |
| 3,036,249 | 5/1962 | Hall | 317—242 X |

OTHER REFERENCES

Semiconductor Productor Products, Tantalum Capacitors, Kass, S., May/June 1958, pp. 39–40.

JOHN F. BURNS, *Primary Examiner.*

DARRELL L. CLAY, *Examiner.*